May 15, 1928.

E. T. FERNGREN 1,670,247

PLURALITY SHEET DRAWING APPARATUS

Filed Feb. 20, 1925 2 Sheets-Sheet 1

INVENTOR.
Enoch T. Ferngren.
Frank Fraser
ATTORNEY.

May 15, 1928. 1,670,247
E. T. FERNGREN
PLURALITY SHEET DRAWING APPARATUS
Filed Feb. 20, 1925 2 Sheets-Sheet 2
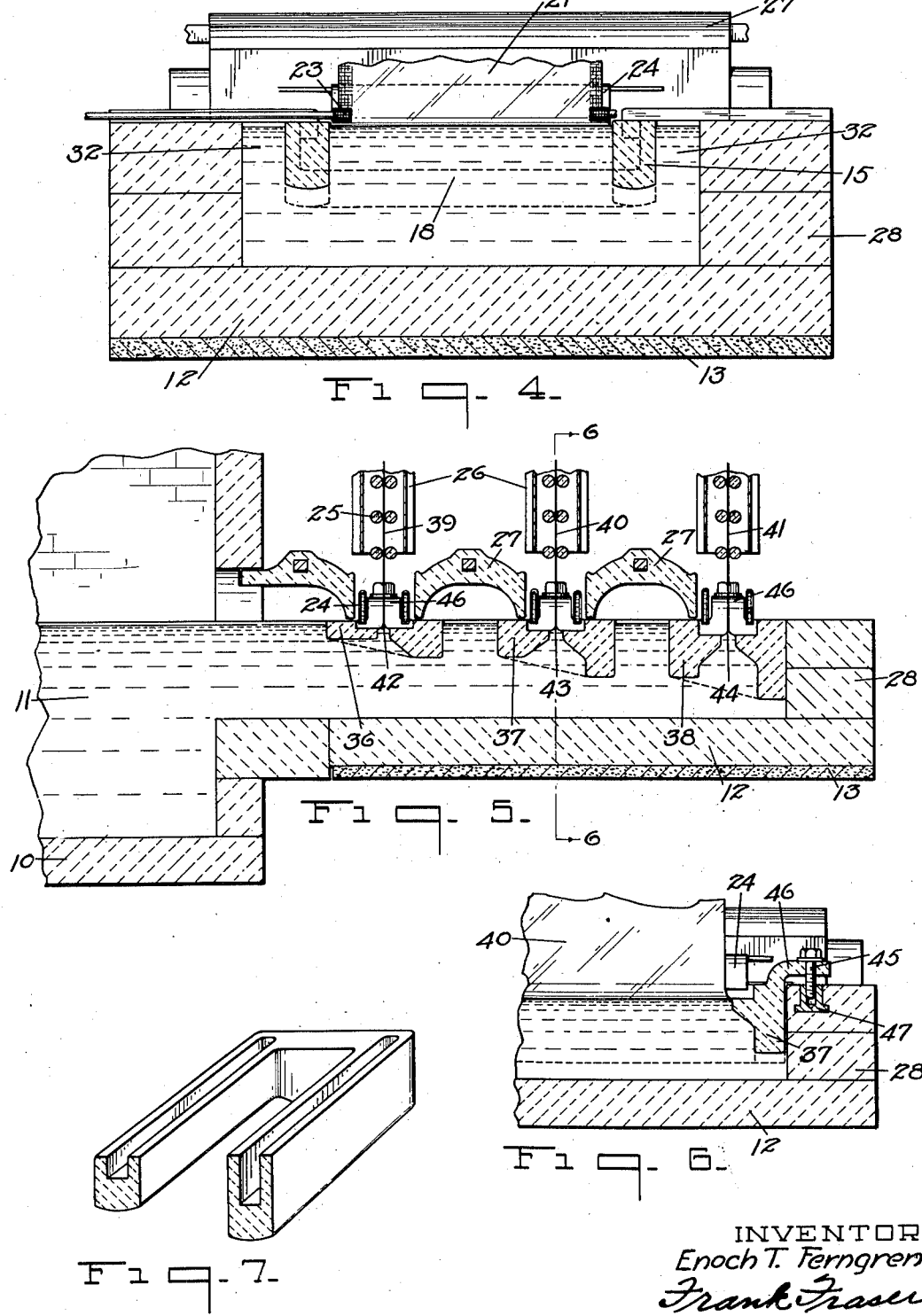
INVENTOR.
Enoch T. Ferngren.
Frank Fraser
ATTORNEY.

Patented May 15, 1928.

1,670,247

UNITED STATES PATENT OFFICE.

ENOCH T. FERNGREN, OF TOLEDO, OHIO, ASSIGNOR TO THE LIBBEY-OWENS SHEET GLASS COMPANY, OF TOLEDO, OHIO, A CORPORATION OF OHIO.

PLURALITY-SHEET-DRAWING APPARATUS.

Application filed February 20, 1925. Serial No. 10,492.

The present invention relates to sheet glass apparatus, and has particular reference to an apparatus wherein a plurality of sheets are drawn from a single tank.

An important object of the invention is to provide a sheet glass apparatus wherein a plurality of sheets are drawn from a single tank, and includes an arrangement of parts whereby the supply of glass advanced to each sheet source will be uniformly constant in solutional properties.

Another object of the invention is to provide an apparatus for producing a plurality of sheets from a single tank, and includes means whereby each of the sheets drawn will be continuously and uniformly supplied with a source of molten glass, the said apparatus being so arranged that all of the supplying glass will be used up, by which the tendency for stagnation of glass will be eliminated as far as possible.

Still another object of the invention is to provide a sheet glass drawing apparatus for producing a plurality of sheets simultaneously from a single tank, the said tank having a plurality of members partially submerged in the glass thereof, the said members being disposed at different depths in said glass whereby a substantially different stratum flow to each sheet will be had.

A further object is to provide an apparatus for making it possible to simultaneously draw three or more first-class sheets from a single tank, and includes a plurality of members disposed in said tank for controlling the supply movement of the glass to the sheets, the said members each being disposed at different depths in said glass so that each respective sheet will be continuously and uniformly fed by a supply glass of like density and viscosity.

Other objects and advantages of the invention will become apparent during the course of the following description.

In the drawings wherein like numerals are employed to designate like parts throughout the same:

Fig. 4 is a vertical transverse section through one of the sheet drawing mechanisms, Fig. 5 is a vertical longitudinal section through a slightly modified form of construction, Fig. 6 is a section on line 6—6 in Fig. 5, and Fig. 7 is a fragmentary perspective view of a portion of the apparatus.

Heretofore a plurality of sheets have been drawn from a single tank but the quality of the sheets have not been entirely satisfactory due to the fact that the first sheet would consume the major portion of the usable glass, and by the time the sheet supplying glass has reached the point of draw in the remaining sheets it is not in a condition suitable for the purposes of forming a good first-class sheet.

In the present instance it is the desire to submerge members in a pool of molten glass in a manner that each of the sheets will be supplied with sufficiently workable glass, the supply being in continuous motion and preferably from the different stratums of the supply body. This so-called stratum flow is accomplished by submerging the members to different depths so that each member will be largely supplied with glass from its own stratum. A sheet of glass formed from the same depth stratum of the molten solution will be of a better quality than if the same sheet were drawn from glass flowing irregularly from various stratums.

Figure 1:
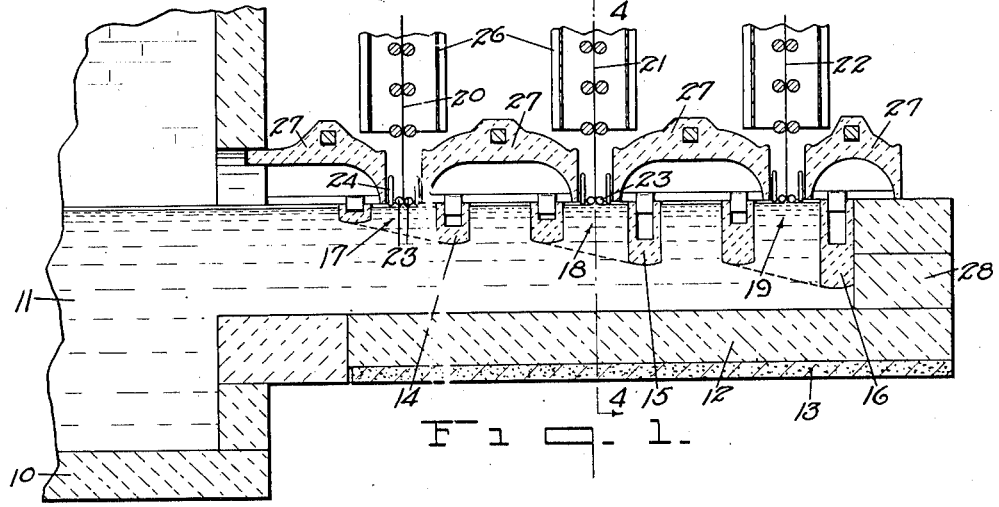
Fig. 1 is a vertical longitudinal section through a portion of the apparatus.

In Fig. 1 is shown one preferred form of the invention wherein the numeral 10 designates the tank furnace which forms and conditions the glass 11, and which has communication with the open tank 12, which may be provided with a form of insulation 13 on the bottom and sides thereof. Partially submerged in the molten glass in the tank 12 are the floater members 14, 15 and 16. The floater members are preferably rectangular in configuration and are formed so that one of their sides is deeper than the other as is clearly shown. The floaters 14, 15 and 16 are adapted to be submerged in the pool of glass to form a restricted pool or source 17, 18 and 19. In Fig. 1 the floater 17 is submerged just a trifle below the surface of the glass 11, while the lower edge of the shorter side of the floater 18 is substantially in the same longitudinal plane with the lower edge of the longer side of the floater 14. In the same manner the shorter edge of the floater 16 is substantially in the same longitudinal plane as the lower edge of the longer side of the floater 15. The sheets 20, 21 and 22 are drawn from the sources of glass 17, 18 and 19 respectively. The sheets 20 may be held to width by means of the rotatable rolls 23 arranged in the meniscus of the sheet source, while heat-absorbing means 24 may be employed to absorb sufficient heat from the glass to produce a sheet capable of sustaining its own weight. The sheet 20 is carried up between the rolls 25 which are contained in the housing 26. Cover-tiles 27 may be employed to cover the top surface of the pool of glass 11 as is clearly shown. These cover-tiles 27 act to reflect the heat radiated from the main body of glass upon the sheet sources within the members 14, 15 and 16. This radiated heat will assist in conditioning the glass to the proper temperature for being drawn into sheet form.

It is to be understood that the form of drawing mechanism herein described is to be considered as diagrammatic, merely showing one manner in which the sheets may be drawn from the pools 17, 18 and 19.

As the glass 11 flows toward the end 28, the upper stratum will be trapped in the first floater 14, while the two lower stratums will be free to pass below the lower edge of the longer side thereof. The second stratum will be trapped or will be consumed in the pool 18 and the sheet drawn therefrom. The last stratum will likewise be taken care of in the last floater 16. As the sheets 20, 21 and 22 are continuously drawn, and as the rate of flow and the depth of the floater can be regulated to suit requirements it will be seen that each stratum can be regulated to be taken care of by its respective sheet so that the same sheet will be supplied from the same stratum at all times. Thus the temperature of the glass and the resultant viscosity thereof will be uniform for each sheet, although the temperature of the glass entering into the various sheets will be different. A discharge opening 29 may be formed in the end 28 and controlled by a gate 30 so that a continuous overflow of glass can be had at the extreme end of the apparatus to prevent backing up of stagnation of the glass. In this manner all of the glass passing through the tank 12 will be consumed in the formation of the sheets or will be permitted to overflow through the discharge opening 29, so that there will be no tendency for stagnation of glass with consequent devitrification thereof.

Figure 2:
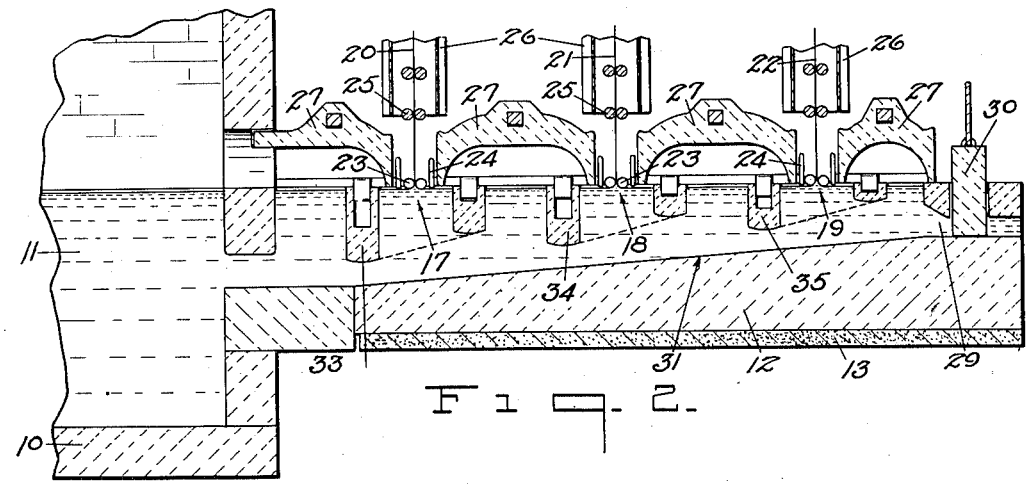
Fig. 2 is a similar view showing a slightly modified arrangement of parts.
Figure 3:
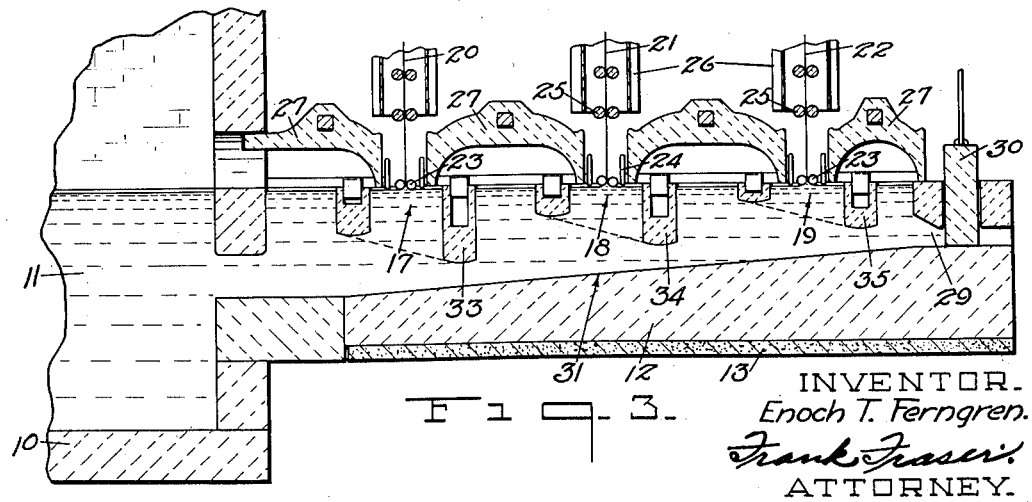
Fig. 3 is still another view showing another arrangement of parts.

In Figs. 2 and 3 the arrangement of the floaters is slightly different, while the bottom of the tank 12 is inclined as at 31. In the modification shown in Figs. 2 and 3, the floaters are relatively shorter than the width of the tank as shown in Fig. 4, thus forming channels 32 between the ends of the floater and the sides of the said pot. The flow of glass in the modifications shown in Figs. 2 and 3 is slightly different than that shown in Fig. 1. In Figs. 2 and 3, the lower stratum of glass is consumed in the first floater which is designated in Figs. 2 and 3 by the numeral 33. The upper stratums are dammed off by the wall of the floater and are carried around through the channels 32, which being relatively narrow create a swift movement of glass, thus preventing stagnation. After passing around the floater 33, the glass is in part caused to dip down so that the next lower stratum or the lower stratum at that point is permitted to flow within the floater 34. At the same time the upper stratum flows around through the channels formed by the ends of the floater 34 in the sides of the pot to supply the floater 35 with glass. In other words, the floaters 33, 34, and 35 respectively are each supplied with glass from the same stratum but the flow movement is controlled in a different manner, namely, that the first floater is furnished with the lower stratum, the next floater the intermediate stratum, and the last floater the upper stratum, while in the first instance the first floater is furnished with the upper stratum, the second floater with the intermediate stratum, and the last ⓕater with the lower stratum. Any stagnation tendency of the surplus glass is taken care of by the discharge opening 29 and gate 30, so that the glass movement will at all times be in the same direction.

In Fig. 5 the same principle is utilized to supply so-called deputers 36, 37 and 38. The deputers are broadly old in the glass art and utilize the hydro-static for supplying glass under pressure to the sheets 39, 40 and 41, which are drawn from the sources 42, 43 and 44. The deputers function in the same manner as in the prior art, but the difference resides in the manner in which the supply of glass is flowed thereto. The depth of the deputers may be controlled by means of the screw-threaded shaft 45 operable through the extensions 46, the said shafts being received in the bushings 47 carried in the sides of the tank.

The number of members and consequently the number of sheets may be increased as desired, thus adapting the machine for huge production from a single melting furnace.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, a tank furnace, a tank communicating therewith and having a mass of molten glass therein, and means for drawing a plurality of sheets therefrom, each of said sheets being drawn from a different stratum of glass.

2. In sheet glass apparatus, a tank furnace, a tank communicating therewith and having a mass of molten glass therein, means for creating a plurality of sheet sources, means for drawing a sheet from each sheet source, and means for continuously replenishing each sheet source with glass from a different stratum.

3. In sheet glass apparatus, a tank furnace, a tank communicating therewith and containing a mass of molten glass, a plurality of sheet sources, means for drawing a sheet from each sheet source, and means for causing the sheet sources to be constantly replenished with molten glass from different stratums.

4. In sheet glass apparatus, a tank furnace, a tank communicating therewith and having a mass of molten glass therein, a plurality of members disposed in the molten glass, and each being submerged to a different depth therein, and means for drawing a sheet from each of said members.

5. In sheet glass apparatus, a tank furnace, a tank communicating therewith and having a mass of molten glass therein, a plurality of members disposed in the molten glass, and each being submerged to terminate a different depth therein, each of said members enclosing a sheet source on at least two sides, and means for drawing a sheet from each of the sheet sources.

6. In sheet glass apparatus, a tank furnace, a tank communicating therewith and containing a mass of molten glass, a plurality of members disposed in the molten glass and each being submerged to a different depth therein, each of said members enclosing a sheet source on at least two sides, and means to draw a sheet from each sheet source, each of the sheet sources being replenished from a different stratum of glass.

7. In sheet glass apparatus, a container for a mass of molten glass, a plurality of refractory members partially submerged therein to different depths, said members enclosing a source from which a sheet may be drawn, and means for heating the said source by radiated heat.

8. In sheet glass apparatus, a container for a mass of molten glass, a plurality of members partially submerged therein to enclose sources of glass from which sheets may be drawn, and means for heating the sources of glass by heat radiated from the main supply of molten glass.

9. In sheet glass apparatus, a container for a mass of molten glass, a plurality of refractory members partially submerged therein, each member being submerged to a different depth, whereby a source of glass is enclosed by each member and adapted to be replenished by glass from a different stratum, means for heating the sources by heat radiated from the main body of glass, and means for drawing a sheet from each sheet source.

10. In sheet glass apparatus, a container for a mass of molten glass, a plurality of deputers disposed in the glass, each deputer being submerged to a different depth whereby the deputers are each supplied with glass from a different stratum.

11. In sheet glass apparatus, a container for a mass of molten glass, a plurality of deputers having one side longer than the other partially submerged therein to different depths to form a plurality of sheet sources under pressure, each sheet source being replenished with glass from a different stratum than any other sheet source, and means for drawing a sheet from each sheet source.

12. In sheet glass apparatus, a container for a mass of molten glass, a plurality of deputers disposed in the glass, each deputer being submerged to a different depth, and means for heating the glass in the deputers by heat radiated from the main body of glass.

13. In sheet glass apparatus, a set of deputers partially submerged adjacent one another in a bath of molten glass for drawing a plurality of sheets from said bath, each of said deputers having a different height.

14. In sheet glass apparatus, a set of deputers partially submerged adjacent one another in a bath of molten glass for drawing a plurality of sheets from said bath, each of said deputers being of a different height, and having one side deeper than the other.

15. The process of producing a plurality of sheets of glass, consisting in drawing a plurality of sheets of glass from a mass of molten glass, each of said sheets being drawn from a different stratum of glass.

16. The process of producing a plurality of sheets of glass, consisting in creating a plurality of sheet sources, drawing a sheet from each sheet source, and continuously replenishing each sheet source with glass from a different stratum.

Signed at Toledo, in the county of Lucas, and State of Ohio, this 17th day of February, 1925.

ENOCH T. FERNGREN.